United States Patent [19]

Kobayashi et al.

[11] Patent Number: 4,484,553

[45] Date of Patent: Nov. 27, 1984

[54] ENGINE IDLING ROTATIONAL SPEED CONTROL DEVICE

[75] Inventors: Nobuyuki Kobayashi; Hiroshi Ito; Mamoru Kobashi, all of Aichi, Japan

[73] Assignee: Toyota Jidosha Kabushiki Kaisha, Toyota, Japan

[21] Appl. No.: 407,171

[22] Filed: Aug. 11, 1982

[30] Foreign Application Priority Data

Aug. 13, 1981 [JP] Japan .................. 56-126888

[51] Int. Cl.³ .............................. F02M 3/00
[52] U.S. Cl. .................. 123/339; 123/586; 123/585
[58] Field of Search .......... 123/339, 585, 586, 587, 123/588

[56] References Cited

U.S. PATENT DOCUMENTS

| | | | |
|---|---|---|---|
| 4,146,000 | 3/1979 | Hattori et al. | 123/587 |
| 4,240,145 | 12/1980 | Yano et al. | 123/587 |
| 4,289,100 | 9/1981 | Kinugawa et al. | 123/585 |
| 4,344,398 | 8/1982 | Ikeura | 123/339 |
| 4,344,399 | 8/1982 | Matsumara et al. | 123/339 |
| 4,365,599 | 12/1982 | Ikeura | 123/339 |
| 4,365,601 | 12/1982 | Yamazoe et al. | 123/339 |
| 4,375,208 | 3/1983 | Furuhashi et al. | 123/585 |
| 4,378,767 | 4/1983 | Kobashi et al. | 123/339 |
| 4,389,996 | 6/1983 | Yaegashi et al. | 123/339 |
| 4,392,468 | 7/1983 | Kobashi et al. | 123/585 |
| 4,401,073 | 8/1983 | Furuhashi | 123/339 |

FOREIGN PATENT DOCUMENTS 3020131 12/1980 Fed. Rep. of Germany ...... 123/586

Primary Examiner—Parshotam S. Lall
Attorney, Agent, or Firm—Cushman, Darby & Cushman

[57] ABSTRACT

A stepping motor is driven such that a rotational speed of an engine falls within a range of a target rotational speed determined in accordance with at least an engine coolant temperature when a throttle valve is substantially fully closed, in order to control an opening area of an air flow rate control valve. In the control operation, a lower limit of the opening area of the control valve is set to prevent the opening area from being reduced beyond a predetermined area in order to prevent engine stall. A predetermined setting is stored in a predetermined area each time when a vehicle speed signal from a vehicle speed sensor is received and the predetermined setting is decremented under a predetermined condition. When the decremented setting reaches zero, a current lower limit is maintained.

13 Claims, 7 Drawing Figures

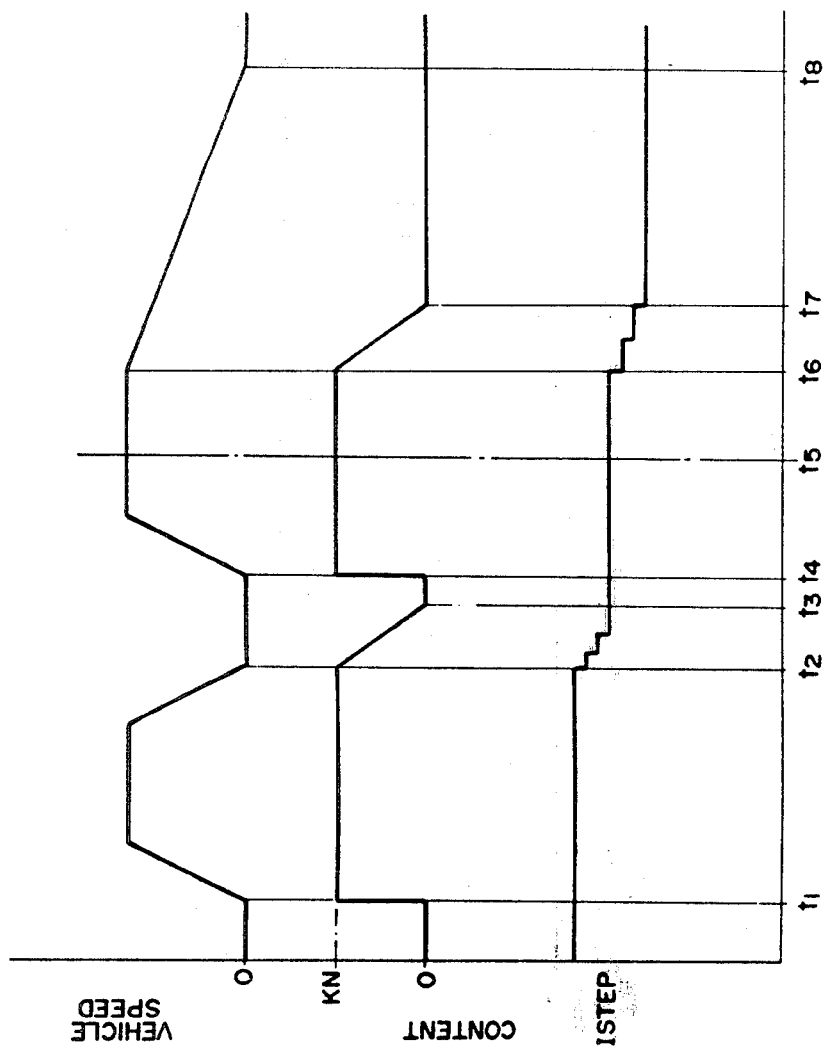

ENGINE IDLING ROTATIONAL SPEED CONTROL DEVICE

BACKGROUND OF THE INVENTION

1. Field of the Invention

The present invention relates to an engine idling rotational speed control device, and more particularly to an engine rotational speed control device for controlling an idling rotational speed of an engine.

2. Description of the Prior Art

In an engine such as an automobile engine, an engine rotational speed control device is usually used in order to maintain smooth rotation of the engine even when a throttle valve is in a full-close position by removal of a foot of a driver from an accelerator pedal in a non-load condition. One type of the engine rotational speed control device comprises intake air flow rate control means for controlling an intake air quantity in the idling position of the engine or the full-close position of the throttle valve, a stepping motor for driving the intake air flow rate control means and an electronic control circuit for controlling the stepping motor in accordance with the operating condition of the engine.

When such a device is used in an engine having an electronically controlled fuel injection device including a throttle body in which the throttle valve for controlling the intake air quantity is arranged and a fuel injection device for injecting fuel to air suctioned into an intake manifold through the throttle body, a bypass passage for bypassing the throttle valve of the throttle body is provided to control the opening area of the bypass passage by an intake air flow rate control valve driven by the stepping motor in the idling condition or the full-close position of the throttle valve in order to control the intake air quantity in the idling condition. With the idling rotational speed control device provided with the air flow rate valve driven by the step motor as described above, in the electronic control circuit, the increase or decrease in pulse number for driving the step motor from the reference position is calculated, whereby the opening degree of the air flow rate control valve is brought into register with the position of the step motor stored in the electronic control circuit, so that the opening degree of the air flow rate control valve can be detected.

As shown in FIG. 1, in the prior art device, when an ignition switch is turned off from its on position at a time $t_1$, the stepping motor is driven to fully open the control valve at a time $t_2$ in order to prevent freeze in a low temperature environment. As the engine is in a full operation at a time $t_3$, the flow rate control valve is abruptly closed by the stepping motor (see a time period between $t_3$ and $t_4$) to attain an idling rotational speed set in accordance with an engine coolant temperature. After a time $t_4$, the step position of the stepping motor is corrected such that a target idling rotational speed for the engine coolant temperature is attained and the step position of the stepping motor is controlled to maintain the target idling rotational speed.

In this manner, the engine idling rotational speed is controlled to attain the target rotational speed for the coolant temperature. This control is attained when the following conditions are met; a throttle sensor is on, a motor vehicle speed sensor indicates that a vehicle speed is no higher than several Km/h, and a predetermined time period has elapsed since the start control for driving the stepping motor to a predetermined position (time $t_4$ in FIG. 1) after the start of the engine was completed. If the vehicle speed signal is not produced during the running of the vehicle by a failure of the vehicle speed sensor or the break of a wire between the vehicle speed sensor and the electronic control circuit, the above conditions may be met when the vehicle speed is decelerated. In such a case, the engine may stall.

SUMMARY OF THE INVENTION

It is an object of the present invention to provide an engine idling rotational speed control device which is free from the above problems.

In accordance with one feature of the present invention, in the idling rotational speed control, a lower limit of an opening area of intake air flow rate control means is established and a predetermined setting is written in a predetermined area each time when a vehicle speed signal from a vehicle speed sensor is received by a control circuit and the predetermined setting is decremented under a predetermined condition, and when the decremented setting reaches zero, the current lower limit is maintained.

In a preferred embodiment of the present invention, a feedback control is effected in the following manner. In this embodiment, intake air flow rate control means comprises a flow rate control valve and a stepping motor for driving the control valve. A converted value ISTA of stepping position of the stepping motor corresponding to a target idling rotational speed of the engine is determined in accordance with a selected one of four conversion expressions preset for a N-range and a D-range of an automatic transmission car and an ON-condition and an OFF-condition of an air conditioner. A predetermined number is subtracted from the number of steps ISTEP which has been previously learned by and stored in the device to determine a lower limit of the stepping motor.

On the other hand, a vehicle speed sensor is provided and each time when a vehicle speed pulse signal is received by a control circuit from the vehicle speed sensor, a predetermined setting is written in a predetermined area of memory means. The predetermined setting is decremented under a predetermined condition and when the decremented setting reaches zero, the lower limit is set to that value. In summary, if the lower limit is larger than the current number of steps of the stepping motor, the predetermined setting and the number of steps ISTEP are adapted to be decremented and when it is zero the predetermined setting and the number of steps ISTEP are adapted to be not decremented so that the current lower limit is maintained.

BRIEF DESCRIPTION OF THE DRAWINGS

FIG. 4 shows a flow chart for the operation of the embodiment of FIG. 2, and FIGS. 5A, 5B and 5C show time flow charts for explaining the operation of the embodiment of FIG. 2, in which FIG. 5A shows a vehicle speed, FIG. 5B shows a setting in a register and FIG. 5C shows the number of steps ISTEP.

DETAILED DESCRIPTION OF THE PREFERRED EMBODIMENT

Figure 1:
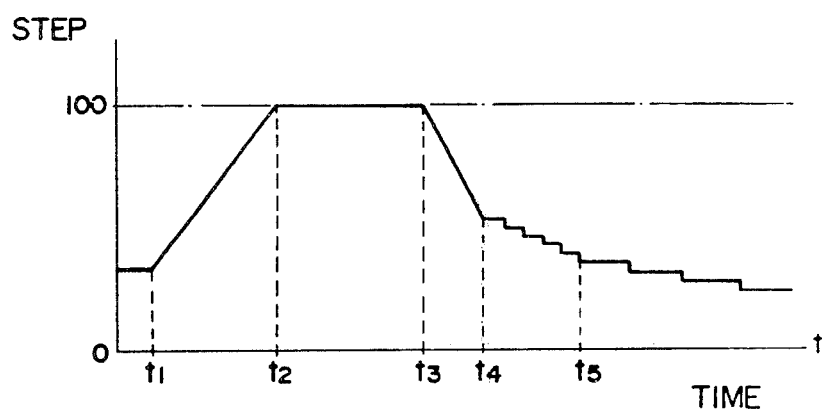
FIG. 1 shows a time versus stepping position chart of a stepping motor.
Figure 2:
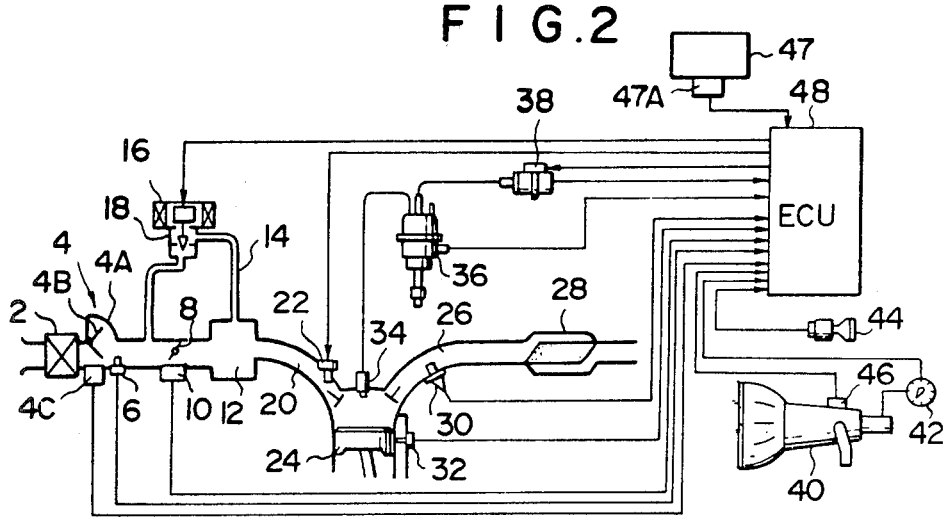
FIG. 2 shows a block diagram of one embodiment of the present invention.

FIG. 2 shows a block diagram of one embodiment of the engine rotational speed control device of the present invention. Detailed description will hereunder be given of such device that is applied to an automatic transmission car. The present embodiment has an air cleaner 2 and an air flow meter 4, which functions as an intake air quantity sensor, arranged downstream of the air cleaner 2. The air flow meter 4 comprises a compensation plate 4B pivotably mounted in a damping chamber 4A and a potentiometer 4C for sensing an opening angle of the compensation plate 4B. The intake air quanitity is thus sensed as a voltage from the potentiometer 4C. An intake air temperature sensor 6 for sensing a temperature of the intake air is arranged in the vicinity of the air flow meter 4.

A throttle valve 8 is arranged downstream of the air flow meter 4, and a throttle sensor 10 such as a throttle switch for sensing an opening area of the throttle valve 8 to produce a throttle position signal is arranged in the vicinity of the throttle valve 8. Provided downstream of the throttle valve 8 is surge tank 12 to which a bypass passage 14 for bypassing the throttle valve 8 is connected. An intake air flow rate control valve 18 which is controlled by a stepping motor 16 is arranged in the bypass passage 14. In general, in an idling condition of the engine, the intake air bypassed the throttle valve 8 flows into the surge tank 12 through the intake air flow rate control valve 18. As will be described later, the opening area of the control valve 18 is feedback-controlled in order to maintain a desired engine idling rotational speed which is related to an operating condition of a motor vehicle.

An intake manifold 20 is connected to the surge tank 12 and a fuel injection device 22 is arranged to extend into the intake manifold 20. The intake manifold 20 is connected to a combustion chamber of an engine 24, which is connected to a catalyst converter 28 filled with a three-way catalyst, through an exhaust manifold 26. Numeral 30 denotes an $O_2$ sensor for controlling an air-to-fuel ratio of a gas mixture to a vicinity of a stoichiometric air-to-fuel ratio, and numeral 32 denotes a coolant temperature sensor for sensing a temperature of an engine coolant.

Ignition plugs 34 of th engine 24 are connected to a distributor 36 which is connected to an igniter 38. Numeral 40 denotes a transmission, numeral 42 denotes a vehicle speed sensor and numeral 44 denotes an ignition switch. The transmission gear 40 is provided with a shift position sensor 46 having a neutral start switch for sensing a neutral position and a drive position of a shift lever.

The distributor 36 is provided with a gear-shaped signal rotor or a timing rotor fixed to a distributor shaft and a pickup mounted on a housing of the distributor 36 to oppose to teeth of the signal rotor. As the signal rotor rotates, the amount of magnetic flux which link to the pickup changes so that an engine rotational speed signal is produced. The signal rotor and the pickup form an engine rotational speed sensor.

An air-conditioner 47 for regulating an inside temperature and an inside humidity of the motor vehicle and for purifying an inside air thereof is arranged under an instrument panel in the motor vehicle. The air-conditioner 47 is provided with an air-conditioner sensor 47A which outputs an air-conditioner ON signal when the air-conditioner 47 is energized.

Figure 3:
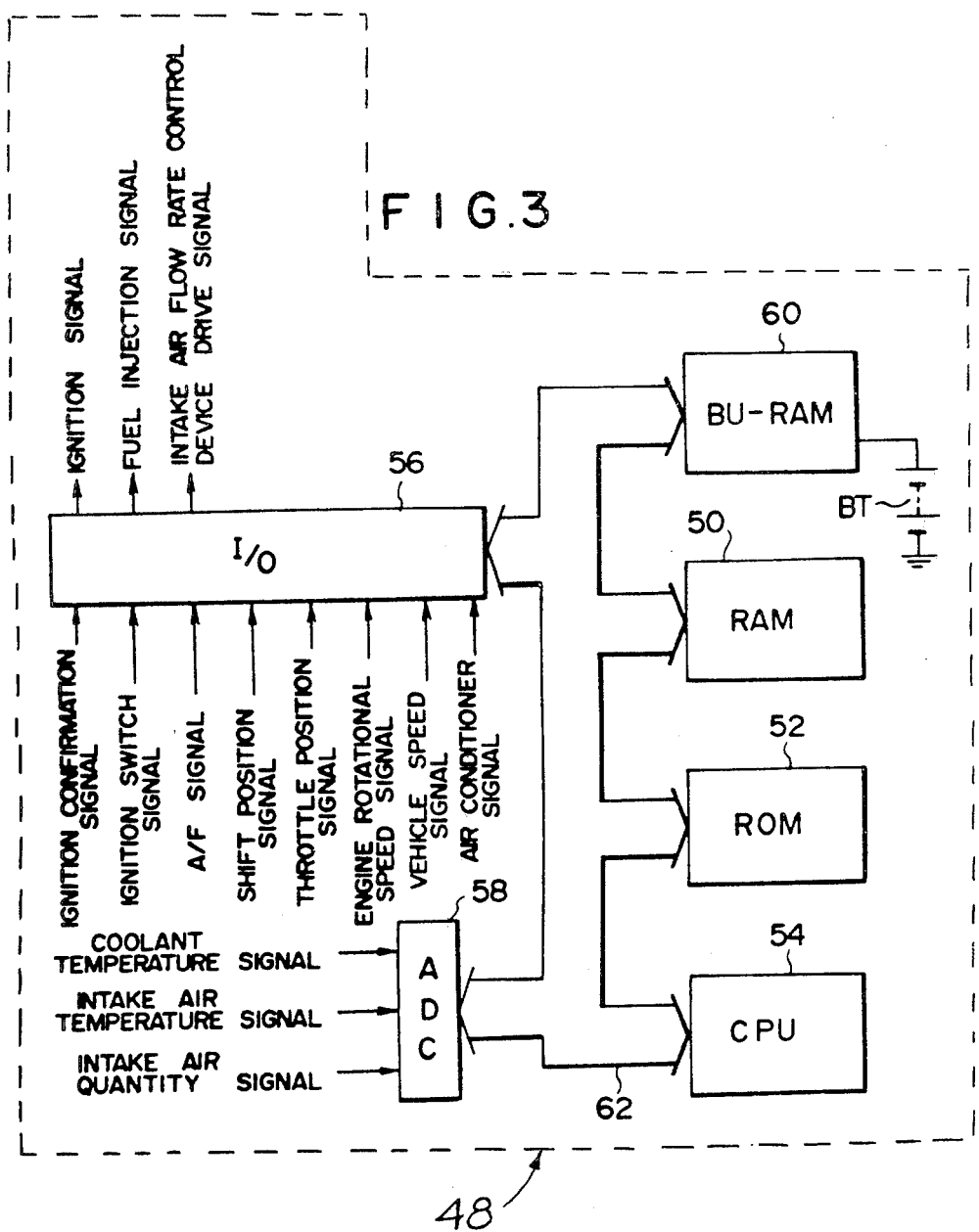
FIG. 3 shows a block diagram of an electronic control circuit of the embodiment of FIG. 2.

Referring to FIG. 3, an electronic control circuit 48 which receives signals from the vehicle speed sensor 42, the shift position sensor 46 and other sensors comprises a random access memory (RAM) 50, a read-only memory (ROM) 52, a central processing unit (CPU) 54, an input/output circuit (I/O) 56, an analog-to-digital converter (ADC) 58 and a backup random access memory (BU-RAM) 60. The BU-RAM 60 is powered from a separate battery BT and a memory content thereof is not erased by other than write instruction. The RAM 50, ROM 52, CPU 54, I/O 56, ADC 58 and BU-RAM 60 are interconnected through a bus 62 including a data bus.

The following conversion expressions used in a hot idling control (which is effected when an engine coolant temperature is higher than 70° C.) are stored in a ROM 52. A converted value ISTA calculated in accordance with one of the conversion expressions is compared with the number of steps ISTEP which has been stored in a BU-RAM 60 when the hot idling control was effected.

Respective conversion expressions for calculating the converted value ISTA are given as follows in accordance with positions of a shift lever which are detected by the shift position sensor 46 and operational conditions of the air-conditioner 47 which are detected by the air-conditioner sensor 47A.

(i) When the shift lever is in a neutral position (N range) and the air-conditioner 47 is OFF.

$$ISTA = CPMT - (NF - \beta_1)/\alpha_1 \qquad (1)$$

(ii) When the shift lever is in a drive position (D range) and the air-conditioner 47 is OFF.

$$ISTA = CPMT - \gamma_1 - (NF - \beta_2)/\alpha_2 \qquad (2)$$

(iii) When the shift lever is in the neutral position (N range) and the air-conditioner 47 is ON.

$$ISTA = CPMT - \gamma_2 - (NF - \beta_3)/\alpha_3 \qquad (3)$$

(iv) When the shift lever is in the drive position (D range) and the air-conditioner 47 is ON.

$$ISTA = CPMT - \gamma_3 - (NF - \beta_4/\alpha_4 \qquad (4)$$

Where $\alpha_1 \sim \alpha_4$, $\beta_1 \sim \beta_4$ and $\gamma_1 \sim \gamma_3$ are constants, CPMT is a stepping position of the stepping motor 16 stored in the BU-RAM 60, and NF is a target engine idling-up rotational speed for a given engine coolant temperature and is stored in ROM 52 as a table for each of the conditions (i)~(iv). The converted valve ISTA calculated in accordance with one of the conversion expressions (1) ~(4) is stored in an area A of the RAM 50. The stepping position CPMT corresponding to the stepping position of the stepping motor 16 and the previous number of steps ISTEP has been stored in the BU-RAM 60.

The number of steps ISTEP can be stored in the BU-RAM 60 as 12-bit data, 6-bits of which are used as an integer value field for number of steps ISTEP and 5-bits of which are used as a correction value field which is stepped at every 32 cycles.

Applied to the I/O 56 are the engine rotational speed signal from the distributor 36, the throttle position signal from the throttle sensor 10, the shift position signal from the shift position sensor 46, the ignition switch signal from the ignition switch 44, the ignition confirmation signal from the igniter 38, the vehicle speed signal, the air conditioner signal and the air-to-fuel ratio signal from the $O_2$ sensor 30, and the I/O 56 produces an intake air flow rate control device drive signal for controlling the intake air flow rate control device 18, a fuel injection signal for controlling the fuel injection device 22 and an ignition signal for controlling the igniter 38 and the like. The ADC 58 receives the intake air quantity signal from the air flow meter 4, the intake air temperature signal from the intake air temperature sensor 6 and the coolant temperature signal from the coolant temperature sensor 32. Those signals are converted to digital signals by the ADC 58.

The ROM 52 stores therein maps and tables for various operating conditions of the engine, in addition to the tables described above, and the I/O 56 and ADC 58 receive and supply various signals for the operating conditions of the engine, in addition to the signals described above.

An operation of the present embodiment will be described hereunder with reference to FIG. 4. First of all, a feedback control of the intake air flow rate control valve 18 is briefly explained.

The opening area of the intake air flow rate control valve 18 is feedbackcontrolled so that the engine rotational speed is brought into a desirable engine rotational speed for a given engine coolant temperature in the hot idling control, which is effected when the engine coolant temperature is higher than 70° C. The stepping position of the stepping motor 16 is controlled to adjust the opening area of the intake air flow rate control valve 18. The control valve 18 is feedbackcontrolled under the following conditions. In N range, when the engine coolant temperature is higher than 70° C. and the throttle sensor 10 is ON, i.e., the throttle valve is substantially fully closed, and in D range, when the engine coolant temperature is higher than 70° C., a vehicle speed is less than 2 Km/h and the throttle sensor is ON, the feedback control is effected. The feedback control is stopped when the value of the motor stepping position CPMT stored in BU-RAM 60 reaches a predetermined value.

In the feedback control, the engine rotational speed is measured for a predetermined time period, e.g., 2 sec, after a predetermined time period, e.g. 2 sec, has elapsed since a condition of the above-described feedback control was fulfilled, and an average engine rotational speed is calculated. If the average engine rotational speed is beyond an upper or lower limit of the target engine rotational speed, the stepping motor 16 is driven by one step. If the condition of the feedback control is lost in the course of the feedback control, the feedback control is stopped.

Figure 4:
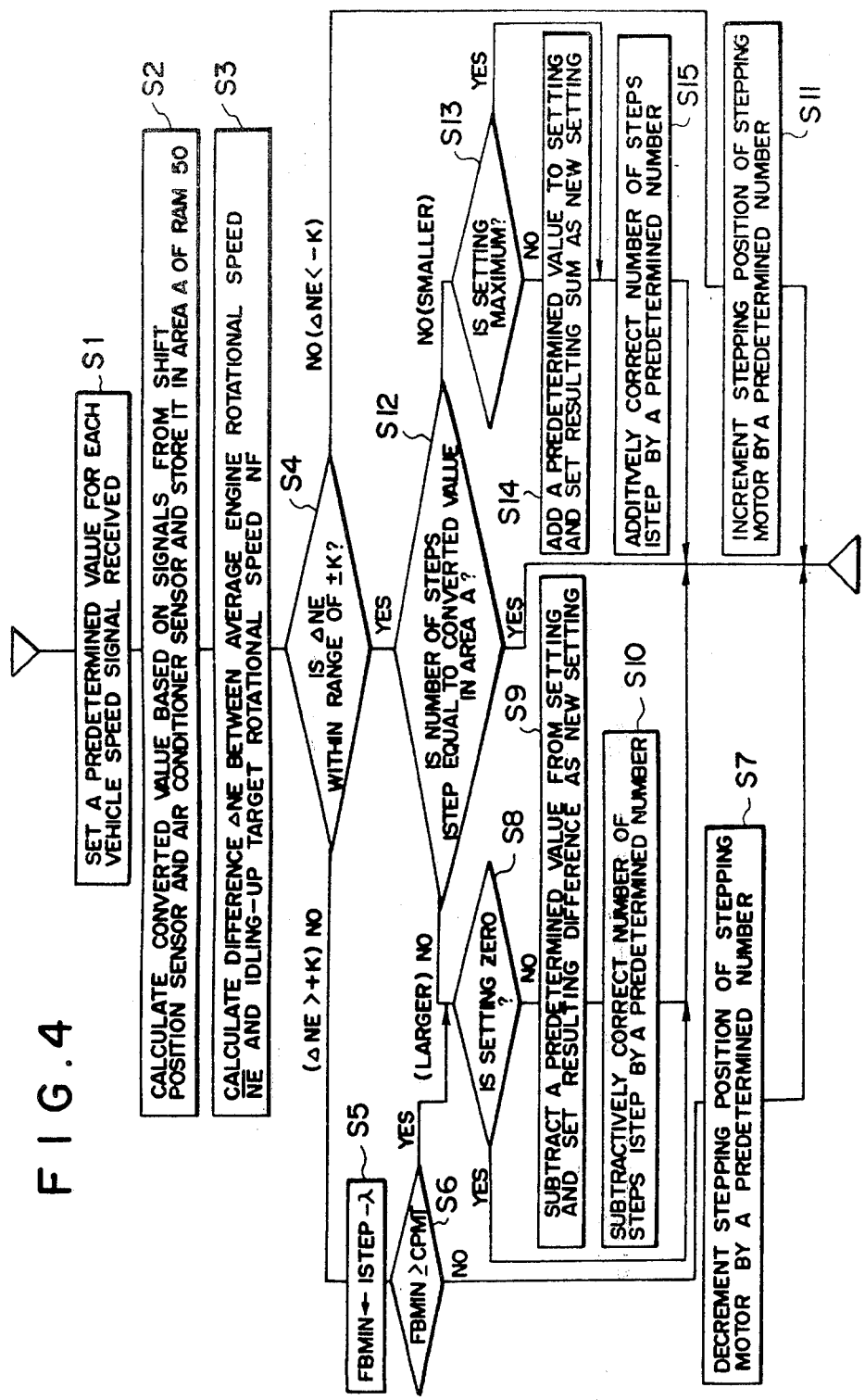

Referring to FIG. 4, in a Step S1, each time when the vehicle speed signal from the vehicle speed sensor is supplied to the control circuit 48, a predetermined setting is set into a register in the control circuit 48. In a Step S2, a signal from the shift position sensor 46 and an ON signal from the air-conditioner sensor 47A indicating the activation of the air-conditioner 47 are taken into the CPU 54, one of the above-described conversion expressions (1)~(4) stored in the ROM 52 is selected based on those signals and the target idling up engine rotational speed NF is determined based on the engine coolant temperature. In addition, the target idling-up engine rotational speed NF is placed into the selected conversion expression to calculate the conversion value ISTA, which is then stored in the area A of the RAM 50.

In a Step S3, a difference $\Delta NE$ between the average engine rotational speed $\overline{NE}$ (which may be an average engine rotational speed in two seconds) and the target engine idling-up rotational speed NF is calculated. In a Step S4, it is checked if the difference $\Delta NE$ is within a predetermined range $\pm K$ (e.g., K=20 rpm), and if $\Delta NE > +K$, the process goes to a Step S5 in which a given constant $\lambda$ (e.g., $\lambda = 3$) is subtracted from the number of steps ISTEP stored in the BU-RAM 60, and the resulting difference is used as a feedback lower limit FBMIN which is then stored in an area FF of the RAM 50. Then the process is shifted to a Step S6.

In the Step S6, the stored feedback lower limit FBMIN is compared with the current stepping position CPMT of the stepping motor 16. If the feedback lower limit FBMIN is smaller than the motor stepping position CPMT, the process goes to a Step S7 in which the stepping position of the stepping motor 16 is decremented by one step so that the opening area of the flow rate control valve 18 is reduced. On the contrary, if the feedback lower limit FBMIN is larger than the current stepping position CPMT stored in the BU-RAM 60, the process goes to a Step S8 in which the setting in the register is checked to determine if it is zero or not. If it is zero, the next step is not carried out, and if it is not zero, the process goes to a Step S9 in which a predetermined value is subtracted from the setting to produce a new setting, and the process further goes to a Step S10 in which the stepping position of the stepping motor 16 is not changed but the number of steps ISTEP is downwardly corrected by 1/32 step and the corrected number of steps is stored in the BU-RAM 60 as a new number of steps ISTEP. In this manner, the number of steps ISTEP stored in the BU-RAM 60 is updated in a learnt mode.

In the Step S4, if the decision is $\alpha NE < -K$, the process goes to the Step S11 in which the stepping position of the stepping motor 16 is incremented by one step to increase the opening area of the flow rate control valve 18.

In addition, if $\Delta NE$ is within the predetermined range $\pm K$, the number of steps ISTEP is corrected so that the number of steps ISTEP is rendered to be equal to the converted value ISTA. More specifically, in a Step S12, the converted value ISTA is compared with the number of steps ISTEP. If the ISTEP is larger than the ISTA, the process is shifted to a Step S8 where the setting is checked to determine if it is zero or not. If it is zero, the correction is no longer made and if it is not zero, the process goes to a Step S9 in which a predetermined value is subtracted from the setting to produce a new setting. The process further goes to a Step S10 in which a predetermined value (e.g. 1/32 step) is subtracted from the number of steps ISTEP and resulting difference is stored in the BU-RAM 60 as a new number of steps ISTEP. In the Step S12, if the ISTEP is smaller than the ISTA, the process is shifted to a Step S13 in which the setting is checked to determine if it is the maximum value or not. If it is not the maximum value, the process goes to a Step S14 in which a predetermined value is added to the setting. The process further goes to a Step S15 in which a predetermined value (e.g. 1/32 step) is added to the number of steps ISTEP to correct the number of steps ISTEP. The resulting sum is stored in the BU-RAM 60 as a new number of steps ISTEP. If the setting is the maximum value in the Step S13, the process goes directly to the Step S15 where the correction described above is effected. If the number of steps ISTEP is equal to the converted value ISTA in Step S12, the correction is not effected.

Referring to FIGS. 5A to 5C, the embodiment of the present invention is explained in further detail. In the following description, it is assumed that the shift lever is in the D-range and the engine coolant temperature is higher than 70° C. FIG. 5A shows a vehicle speed pattern, FIG. 5B shows a setting stored in the register of the CPU 54 and FIG. 5C shows the number of steps ISTEP. As the motor vehicle starts to run at a time $t_1$ and the vehicle speed signal is supplied from the vehicle speed sensor 42 to the CPU 54, a setting KN is registered in the register in response to the vehicle speed signal. When the motor vehicle stops at a time $t_2$, the vehicle speed signal from the vehicle speed sensor 42 is no longer supplied to the CPU 54 and the feedback control is initiated. In the present embodiment, the setting KN is decremented during a time period $t_2 \sim t_3$. The number of steps ISTEP is also decremented in accordance with the flow chart shown in FIG. 4. It is now assumed that the motor vehicle starts to run again at a time $t_4$, an accelerator pedal is stepped off at a time $t_6$ to decelerate the motor vehicle and the vehicle speed sensor 42 fails at a time $t_5$ so that the vheicle speed signal is no longer supplied to the CPU 54.

The feedback condition described above is met at the time $t_6$ and the air flow rate control valve 18 is feedback-controlled. If the decision in the step S6 shown in FIG. 4 is yes, the process goes to the Step S8 where the content in the register is read. The number of steps ISTEP is decremented by 1/32 step at a time in the Step S10 unless the content is zero. If it is determined that the content of the register is zero in the Step S8, the process thereafter does not go to the Step S10 and the number of steps ISTEP is no longer decremented. More specifically, in FIGS. 5B and 5C, when the content of the register reaches zero at a time $t_7$, the number of steps ISTEP is no longer decremented. Thus, when the supply of the vehicle speed signal to the CPU 54 ceases, the number of steps ISTEP is not reduced below the predetermined value.

In accordance with the present invention, when the hot idling control is carried out during the deceleration of the motor vehicle in the failure of the vehicle speed sensor, the feedback lower limit of the stepping motor is not reduced below the predetermined value so that the engine stall in the deceleration of the motor vehicle is prevented.

What is claimed is:

1. An engine idling rotational speed control device for an engine having an associated accelerator pedal and including a main intake passage, a bypass intake passage and a combustion chamber, said device comprising:
   a throttle valve provided in said main intake passage and substantially fully closed when said accelerator pedal is released;
   a flow rate control valve provided in said bypass intake passage for controlling intake air quantity introduced into said combustion chamber of said engine through said bypass intake passage;
   a stepping motor for driving said flow rate control valve;
   a vehicle speed sensor for producing a pulse signal commensurate to a vehicle speed; and
   an electronic control circuit for:
   controlling a step position of said stepping motor such that an engine rotational speed becomes within a target rotational speed range;
   learning an idle step number such that said idle step number decreases when the actual engine rotational speed is more than a target rotational speed and increases when the actual engine rotational speed is less than the target rotational speed;
   determining a lower limit by subtracting a predetermined value from said idle step number, said lower limit being larger than a value representative of full-close state of said intake air flow rate control valve, whereby said intake air flow rate control valve is prevented from being closed below said lower limit;
   detecting an abnormal state of said vehicle speed sensor; and
   interrupting said learning of the idle step number when said abnormal state of said vehicle speed sensor is detected so that the determined lower limit at the time when said learning is interrupted is maintained.

2. A device according to claim 7, wherein in order to learn said idle step number, a converted value is obtained by cancelling an incremental step number for an idle up required in accordance with a load on the engine and/or a coolant temperature from a number of a current step position of the stepping motor, and said idle step number is decremented or incremented so as to coincide with said converted value.

3. An engine idling rotational speed control device according to claim 2, wherein said incremental step number includes a first value predetermined in accordance with a shift position of an automatic transmission car and/or ON-OFF state of an air conditioner and a second value calculated on the basis of a target rotational speed determined by using the coolant temperature.

4. An engine idling rotational speed control device according to claim 2, wherein said converted value is obtained from one of a plurality of conversion expressions predetermined for a first condition in which the shift position of an automatic transmission car is in a drive range and the air-conditioner is in an ON state, second condition in which the shift position is in the drive range and the air-conditioner is in an OFF state, third condition in which the shift position is in a neutral range and the air-conditioner is in the ON state and a fourth condition in which the shift position is in the neutral range and the air-conditioner is in the OFF state.

5. An engine idling rotational speed control device according to claim 2, wherein said lower limit is set when a current engine rotational speed is higher than said target rotational speed and beyond said range, said stepping motor is driven to reduce the flow rate of air introduced into said engine through said flow rate control valve when said lower limit is smaller than a current step position of said stepping motor, said stepping motor is not driven to reduce the intake air flow quantity through said bypass intake passage when said lower limit is greater than the current step position of said stepping motor.

6. An engine idling rotational speed control device according to claim 2, wherein when the engine rotational speed is within the target rotational speed range, said idle step number is learned.

7. A device according to claim 1, wherein in order to detect the abnormal state of said vehicle speed sensor, a predetermined value is set in a predetermined area for each incoming said pulse signal from said vehicle speed sensor, said predetermined value thus set is decremented under a predetermined condition, whereby when said predetermined value in the predetermined area reaches zero, said abnormal state of said vehicle speed sensor is detected.

8. An engine idling rotational speed control device according to claim 7, wherein said lower limit is set when a current engine rotational speed is higher than said target rotational speed and beyond said range, said stepping motor is driven to reduce the flow rate of air introduced into said engine through said flow rate control valve when said lower limit is smaller than a current step position of said stepping motor, and said stepping motor is not driven to reduce the intake air flow quantity through said bypass intake passage when said lower limit is greater than the current step position of said stepping motor.

9. An engine idling rotational speed control device according to claim 7, wherein when the engine rotational speed is within the target rotational speed range, said idle step number is learned.

10. An engine idling rotational speed control device according to claim 1, wherein said lower limit is set when a current engine rotational speed is higher than said target rotational speed and beyond said range, said stepping motor is driven to reduce the flow rate of air introduced into said engine through said flow rate control valve when said lower limit is smaller than a current step position of said stepping motor, and said stepping motor is not driven to reduce the intake air flow quantity through said bypass intake passage when said lower limit is greater than the current step position of said stepping motor.

11. An engine idling rotational speed control device according to claim 1, wherein when the engine rotational speed is within the target rotational speed range, said idle step number is learned.

12. An engine idling rotational speed control device according to claim 11, wherein said idle step number is learned by a value less than 1.0 at every learning timing.

13. An engine idling rotational speed control device for an engine having an associated accelerator pedal and including a main intake passage, a bypass intake passage and a combustion chamber comprising:
  a throttle valve provided in said main intake passage and substantially fully closed when said accelerator pedal is released;
  a flow rate control valve provided in said bypass intake passage for controlling intake air quantity introduced into said combustion chamber of an engine through said bypass intake passage;
  valve driving means for driving said flow rate control valve;
  a vehicle speed sensor for producing a pulse signal commensurate to a vehicle speed; and
  an electronic control circuit for:
  controlling said flow rate control valve through said valve driving means such that an engine rotational speed is brought within a target rotational speed range by increasing or decreasing said intake air quantity introduced into said bypass intake passage;
  learning a first value such that said first value decreases when the actual engine rotational speed is more than a target rotational speed and increases when the actual engine rotational speed is less than the target rotational speed, said first value corresponding to an opening area of said flow rate control valve;
  determining a lower limit by subtracting a predetermined value from said first value, said lower limit being larger than a value representative of full-close state of said intake air flow rate control valve, whereby said intake air flow rate control valve is prevented from being closed below said lower limit;
  detecting an abnormal state of said vehicle speed sensor; and
  interrupting said learning of the first value when said abnormal state of said vehicle speed sensor is detected so that the determined lower limit at the time when said learning is interrupted is maintained.

* * * * *